(12) United States Patent
Yoon et al.

(10) Patent No.: US 8,062,796 B2
(45) Date of Patent: Nov. 22, 2011

(54) ORGANIC ELECTROLYTIC SOLUTION AND LITHIUM BATTERY USING THE SAME

(75) Inventors: Jae-gu Yoon, Suwon-si (KR); Seok-gwang Doo, Seoul (KR); Seung-sik Hwang, Seongnam-si (KR); Kyu-sung Park, Suwon-si (KR); Nina K. Gusarova, Irkutsk (RU); Boris A. Trofimov, Irkutsk (RU)

(73) Assignee: Samsung SDI Co., Ltd., Yongin-si (KR)

( * ) Notice: Subject to any disclaimer, the term of this patent is extended or adjusted under 35 U.S.C. 154(b) by 1405 days.

(21) Appl. No.: 11/508,627

(22) Filed: Aug. 22, 2006

(65) Prior Publication Data

US 2007/0048622 A1    Mar. 1, 2007

(30) Foreign Application Priority Data

Aug. 24, 2005    (KR) .................. 10-2005-0078036

(51) Int. Cl.
*H01M 6/16*    (2006.01)
(52) U.S. Cl. .................. 429/324; 429/326; 429/329
(58) Field of Classification Search .................. 429/326, 429/329
See application file for complete search history.

(56) References Cited

U.S. PATENT DOCUMENTS

| | | | |
|---|---|---|---|
| 5,580,684 A * | 12/1996 | Yokoyama et al. | 429/324 |
| 5,830,600 A * | 11/1998 | Narang et al. | 429/326 |
| 6,087,423 A * | 7/2000 | Kleiner et al. | 524/116 |
| 6,841,301 B2 * | 1/2005 | Heider et al. | 429/199 |
| 6,958,198 B2 * | 10/2005 | Iwamoto et al. | 429/122 |
| 7,399,555 B2 * | 7/2008 | Sano et al. | 429/248 |
| 7,560,595 B2 * | 7/2009 | Otsuki et al. | 568/9 |
| 2002/0076619 A1 * | 6/2002 | Yamada et al. | 429/324 |

FOREIGN PATENT DOCUMENTS

| | | |
|---|---|---|
| JP | 60-023973 | 2/1985 |
| JP | 61-227377 | 10/1986 |
| JP | 61-284070 | 12/1986 |
| JP | 04-184870 | 7/1992 |
| JP | 08-088023 | 4/1996 |
| JP | 2004014351 A * | 1/2004 |
| JP | 2004-55253 | 2/2004 |

OTHER PUBLICATIONS

Patent Abstracts of Japan, Publication No. 2004-055253; Date of Publication: Feb. 19, 2004; in the name of Fusaji Kita et al.
Korean Office Action dated Jun. 25, 2007 for corresponding Korean Patent Application No. 10-2005-0078036.
Patent Abstracts of Japan for Publication No. 60-023973, Date of Publication of Application Feb. 6, 1985 in the name of Yoshimitsu et al.

(Continued)

*Primary Examiner* — Melvin Mayes
*Assistant Examiner* — Melissa Stalder
(74) *Attorney, Agent, or Firm* — Christie, Parker & Hale, LLP

(57) ABSTRACT

Organic electrolytic solutions are provided. One solution includes a lithium salt, an organic solvent including a first solvent having high permittivity and a second solvent having a low boiling point, and a phosphate compound. By using the phosphate based compound, the organic electrolytic solution and the lithium battery including the organic electrolytic solution are flame resistant and have excellent charge/discharge properties. As a result, the lithium battery is highly stable and reliable and has good charge/discharge efficiency.

15 Claims, 3 Drawing Sheets

OTHER PUBLICATIONS

Patent Abstracts of Japan for Publication No. 61-227377; Date of Publication of Application Oct. 9, 1986 in the name of Shishikura et al.

Patent Abstracts of Japan for Publication No. 61-284070; Date of Publication of Application Dec. 15, 1986 in the Name of Shishikura et al.

Patent Abstracts of Japan for Publication No. 04-184870; Date of Publication of Application Jul. 1, 1992 in the name of Ue.

Patent Abstracts of Japan for Publication No. 08-088023; Date of Publication of Application Apr. 2, 1996 in the Hibara et al.

Megahed et al., "Lithium-ion rechargeable batteries", Journal of Power Sources, 1994, 25 pgs., vol. 51, Elsevier Science.

* cited by examiner $IIC_{st}$=29mAh/g  $IIC_{0.05\%}$=28mAh/g  $IIC_{0.5\%}$=22mAh/g  $IIC_{1\%}$=23mAh/g $IIC_{10\%}$=19mAh/g  $IIC_{15\%}$=17mAh/g  $IIC_{20\%}$=13mAh/g  $IIC_{30\%}$=10mAh/g

ORGANIC ELECTROLYTIC SOLUTION AND LITHIUM BATTERY USING THE SAME

CROSS-REFERENCE TO RELATED PATENT APPLICATIONS

This application claims priority to and the benefit of Korean Patent Application No. 10-2005-0078036 filed on Aug. 24, 2005 in the Korean Intellectual Property Office, the entire content of which is incorporated herein by reference.

BACKGROUND OF THE INVENTION

1. Field of the Invention

The present invention relates to an organic electrolytic solution for improving flame resistance and charge/discharge properties, and to a lithium battery including the same.

2. Description of the Related Art

As demand increases for lightweight, portable high performance electronic devices such as camcorders, mobile phones, and laptop computers, research is being conducted into batteries used as power sources for such devices. In particular, rechargeable lithium secondary batteries have 3 times the energy density per-unit weight of Pb storage batteries, Ni—Cd batteries, Ni—H batteries, and Ni—Zn batteries. In addition, lithium secondary batteries can be quickly charged. Therefore, research into and development of rechargeable lithium secondary batteries are increasing.

In general, lithium batteries operate at high operating voltages so that conventional aqueous electrolytic solutions cannot be used due to the violent reaction between the aqueous solution and the lithium contained in the anode. Accordingly, lithium batteries use organic electrolytic solutions prepared by dissolving lithium salts in organic solvents. To that end, organic solvents having high ionic conductivity, high permittivity, and low viscosity are desired. However, it is difficult to obtain organic solvents having these properties. As a result, lithium batteries use mixed solvents containing one organic solvent having high permittivity and another organic solvent having low viscosity.

When a lithium secondary battery uses a carbonate-based polar non-aqueous solvent, the reaction the electrolytic solution with carbon acting as an anode requires excess charges during initial charging. As a result of such an irreversible reaction, a passivation layer (such as a solid electrolyte interface (SEI) membrane) is formed on the surface of the anode. The SEI membrane allows the battery to be stably charged and discharged without further decomposition of the electrolytic solution. The SEI membrane also acts as an ion tunnel through which only lithium ions pass, and prevents cointercalation of the organic solvent (which solvates lithium ions and moves with the lithium ions into the carbon anode), thereby preventing a breakdown of the anode structure.

However, during charging and discharging, the lithium battery is repeatedly subjected to high voltages of 4V or greater. Under such conditions, the SEI membrane (formed of only a polar solvent and a lithium salt) cannot retain the ideal properties described above. That is, the SEI membrane cracks, and thus an insoluble salt precipitates inside and outside of the anode, and gas is generated as the solvent is continuously reduced. Accordingly, the internal pressure of the lithium battery increases and the structure of the lithium battery cracks, making it possible for the electrolytic solution to leak. Furthermore, due to the leaking electrolytic solution, the lithium oxide at the cathode can be exposed to moisture in the air, thereby igniting the lithium battery. In addition, when the battery is frequently exposed to overcharge conditions, the battery becomes overloaded, causing an exothermic reaction to occur therein. When the temperature of the battery is greater than a predetermined temperature, high temperature ignition can occur. Such high temperature ignition is primarily caused by the electrolytic solution.

These problems have been addressed by adding a flame-resistant agent to the electrolytic solution. One such flame-resistant agent is an alkyl phosphoric acid ester ($(RO)_3P=O$). Such phosphoric acid ester compounds have good flame resistance but can be oxidized or reduced depending on the type of anode used. As a result, an excess amount of phosphoric acid ester compound should be used. In particular, when a graphite-based electrode is used as the anode, use of an excessive amount of the compound leads to a substantial decrease in the charge/discharge efficiency of the battery.

Accordingly, there is a need for an organic electrolytic solution having flame resistant properties (self extinguishing properties) and excellent charge/discharge properties which can be used to manufacture a safe and reliable lithium battery.

SUMMARY OF THE INVENTION

The present invention provides a flame resistant organic electrolytic solution for use in forming a reliable, stable battery having improved charge/discharge properties.

The present invention also provides a lithium battery including the organic electrolytic solution.

According to one embodiment of the present invention, an organic electrolytic solution includes a lithium salt, an organic solvent including a first solvent having high permittivity and a second solvent having a low boiling point, and a phosphate compound.

In one embodiment, the phosphate compound may be represented by Formula 1:

In Formula 1, each of $R_1$, $R_2$, and $R_3$ is independently one of a C1 to C20 unsubstituted alkyl group, a C1 to C20 halogen substituted alkyl group, a C2 to C20 unsubstituted alkenyl group, a C2 to C20 halogen substituted alkenyl group, a C6 to C30 unsubstituted aryl group, a C6 to C30 halogen substituted aryl group, a C2 to C30 unsubstituted heteroaryl group, and a C2 to C30 halogen substituted heteroaryl group. In one embodiment, at least one hydrogen atom of each of $R_1$, $R_2$, and $R_3$ is substituted with a halogen atom. In another embodiment, at least two of $R_1$, $R_2$, and $R_3$ are connected to each other.

In one embodiment, the phosphate compound includes at least one compound selected from compounds represented by Formulae 2 and 3:

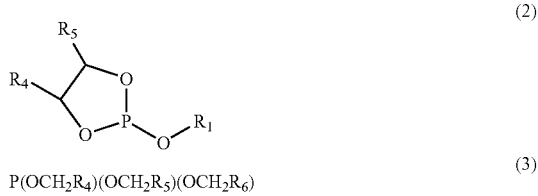

In Formulae 2 and 3, $R_1$ is as described above, and each of $R_4$, $R_5$ and $R_6$ is independently one of a hydrogen atom, a C1 to C20 unsubstituted alkyl group, and a C1 to C2 alkyl group in which at least one hydrogen atom is substituted by a halogen atom.

In another embodiment, the phosphate compound includes at least one compound selected from compounds represented by Formulae 5 through 7:

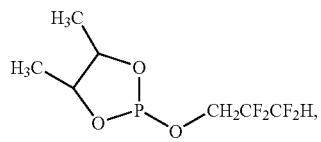
(5)

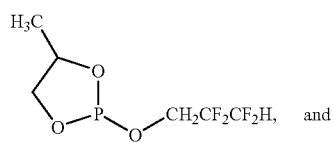
(6)

P(OCH$_2$CF$_2$CF$_2$H)$_3$. (7)

The amount of the phosphate compound may range from about 0.5 to about 20 wt % based on the total weight of the organic solvent. In one embodiment, the amount of the phosphate compound may range from about 1 to about 15 wt % based on the total weight of the organic solvent.

The concentration of the lithium salt may range from about 0.5 to about 2.0M.

The first solvent having high permittivity may be selected from compounds including ethylene carbonate, polypropylene carbonate, butylene carbonate, gamma-butyrolactone and mixtures thereof.

The second solvent having a low boiling point may be selected from compounds including dimethyl carbonate, ethylmethyl carbonate, diethyl carbonate, dipropyl carbonate, dimethoxyethane, diethoxyethane, aliphatic ester derivatives and mixtures thereof.

In one embodiment of the organic electrolytic solution, the lithium salt is LiPF$_6$, the first solvent having high permittivity is ethylene carbonate, the second solvent having a low boiling point is diethyl carbonate, and the phosphate compound is 4-methyl-2-(2,2,3,3-tetrafluoropropoxy)-1,3,2-dioxaphosphorane.

According to another embodiment of the present invention, a lithium battery includes a cathode, an anode, and the organic electrolytic solution described above.

BRIEF DESCRIPTION OF THE DRAWINGS

The above and other features and advantages of the present invention will become more apparent by reference to the following detailed description when considered in conjunction with the attached drawings in which.

DETAILED DESCRIPTION OF THE INVENTION

Figure 1:
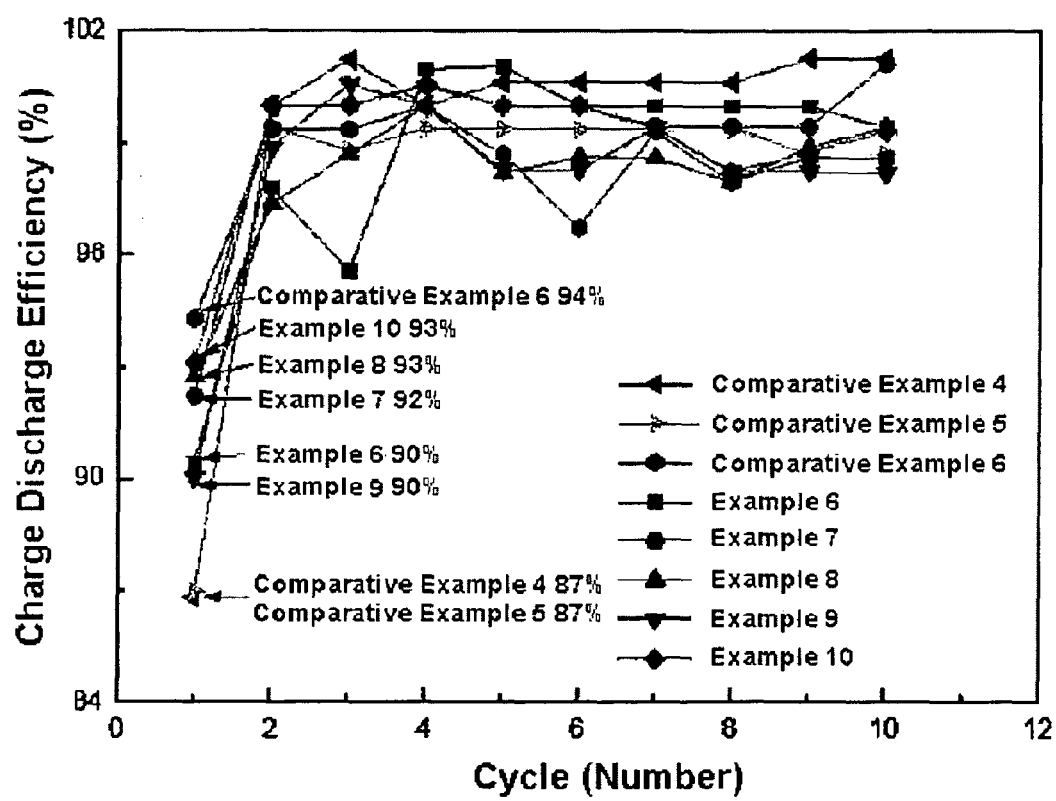
FIG. 1 is a graph of the charge/discharge efficiencies of lithium batteries prepared according to Examples 6 through 10 and Comparative Examples 4 through 6.

An organic electrolytic solution according to one embodiment of the present invention includes a phosphate based compound instead of a phosphoric ester compound (which decreases the charge/discharge properties of the battery). The phosphate compound imparts flame resistance and excellent charge/discharge properties, thus producing a highly stable, highly reliable battery with good charge/discharge efficiency.

An organic electrolytic solution according to one embodiment of the present invention includes a lithium salt, an organic solvent including a first solvent having high permittivity and a second solvent having a low boiling point, and a phosphate compound.

Phosphate compounds are represented by (RO)$_3$P and are also known as phosphate esters. In the phosphate compound, a phosphorus atom reacts with a hydrogen radical generated from the organic solvent during charging and discharging, thereby removing the hydrogen radical. When excess hydrogen radicals are present in the solvent, the excess hydrogen radicals react with the solvent to generate hydrogen gas, thereby increasing the inner pressure of the battery. The phosphate compound can improve cathode stability due to its bulky structure. In addition, hydrogen atoms present in the phosphate compound can be partly or completely substituted by halogen atoms, for example, fluorine. Since halogen atoms are chemically stable, the flame resistance of the electrolytic solution can be improved.

The phosphate compound according to one embodiment of the present invention may be represented by Formula 1:

P(OR$_1$)(OR$_2$)(OR$_3$) (1)

In Formula 1, each of R$_1$, R$_2$, and R$_3$ is independently one of a C1 to C20 unsubstituted alkyl group, a C1 to C20 halogen substituted alkyl group, a C2 to C20 unsubstituted alkenyl group, a C2 to C20 halogen substituted alkenyl group, a C6 to C30 unsubstituted aryl group, a C6 to C30 halogen substituted aryl group, a C2 to C30 unsubstituted heteroaryl group, and a C2 to C30 halogen substituted heteroaryl group. In one embodiment, at least one hydrogen atom of each of R$_1$, R$_2$, and R$_3$ is substituted with a halogen atom, and at least two of R$_1$, R$_2$, and R$_3$ are connected to each other. Through such connection, a phospholane compound is formed. Nonlimiting examples of suitable halogen atoms include F, Cl, Br, I, etc. In one embodiment, the halogen atom is F.

In another embodiment, the phosphate compound may include at least one compound selected from compounds represented by Formulae 2 and 3:

(2)

P(OCH$_2$R$_4$)(OCH$_2$R$_5$)(OCH$_2$R$_6$) (3)

In Formulae 2 and 3, R$_1$ is as described above, and each of R$_4$, R$_5$ and R$_6$ is independently one of a hydrogen atom, a C1 to C20 unsubstituted alkyl group, and a C1 to C20 alkyl group in which at least one hydrogen atom is substituted by a halogen atom.

In yet another embodiment, the phosphate compound may include at least one compound selected from compounds represented by Formulae 5, 6 and 7:

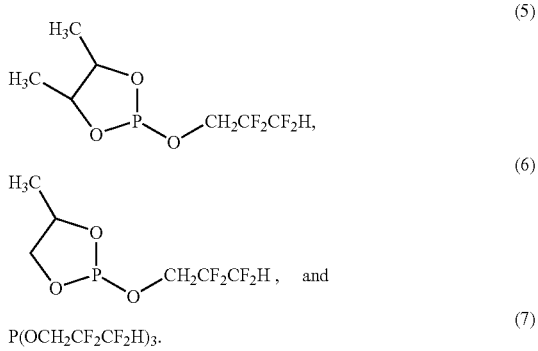

(5)

(6)

(7)

P(OCH$_2$CF$_2$CF$_2$H)$_3$.

The phosphate compound of any one of Formulae 1 through 7 may be provided in an amount ranging from about 0.5 to about 20 wt % based on the total weight of the organic solvent. In one embodiment, the phosphate compound is provided in an amount ranging from about 1 to about 15 wt % based on the total weight of the organic solvent. When the amount of the phosphate compound is greater than about 20 wt %, the amount of effective material affecting the performance of the battery is small and the charge/discharge properties of the battery decrease. On the other hand, when the amount of the phosphate compound is less than about 0.5 wt %, the desired objective of the present invention is difficult to obtain.

The first solvent having high permittivity can be any solvent commonly used in the art. Nonlimiting examples of suitable first solvents having high permittivity include gamma-butyrolactone, cyclic carbonates such as ethylene carbonate, propylene carbonate and butylene carbonate, etc.

The second solvent having a low boiling point can be any solvent commonly used in the art. Nonlimiting examples of suitable second solvents having low boiling points include dimethoxyethane, diethoxyethane, aliphatic ester derivatives, chain carbonates such as dimethyl carbonate, ethylmethyl carbonate, diethyl carbonate and dipropyl carbonate, etc.

The first and second solvents are mixed to a volume ratio ranging from about 1:1 to about 1:9. When the volume ratio is outside this range, the discharge capacity and charge/discharge lifetime of the battery decrease.

The lithium salt can be any lithium salt commonly used in lithium batteries. Nonlimiting examples of suitable lithium salts include LiClO$_4$, LiCF$_3$SO$_3$, LiPF$_6$, LiN(CF$_3$SO$_2$), LiBF$_4$, LiC(CF$_3$SO$_2$)$_3$, and LiN(C$_2$F$_5$SO$_2$)$_2$.

The concentration of the lithium salt in the organic electrolytic solution may range from about 0.5 to about 2 M. When the concentration of the lithium salt is less than about 0.5 M, the conductivity of the organic electrolytic solution decreases, thus decreasing the performance of the organic electrolytic solution. On the other hand, when the concentration of the lithium salt is greater than about 2.0 M, the viscosity of the organic electrolytic solution increases, thus decreasing lithium ion mobility.

An organic electrolytic solution according to one embodiment of the present invention includes LiPF$_6$ as the lithium salt, ethylene carbonate as the first solvent having high permittivity, diethyl carbonate as the second solvent having a low boiling point, and 4-methyl-2-(2,2,3,3-tetrafluoropropoxy)-1,3,2-dioxaphosphorane as the phosphate compound.

A lithium battery including an organic electrolytic solution according to one embodiment of the present invention will now be described in detail.

Figure 3:
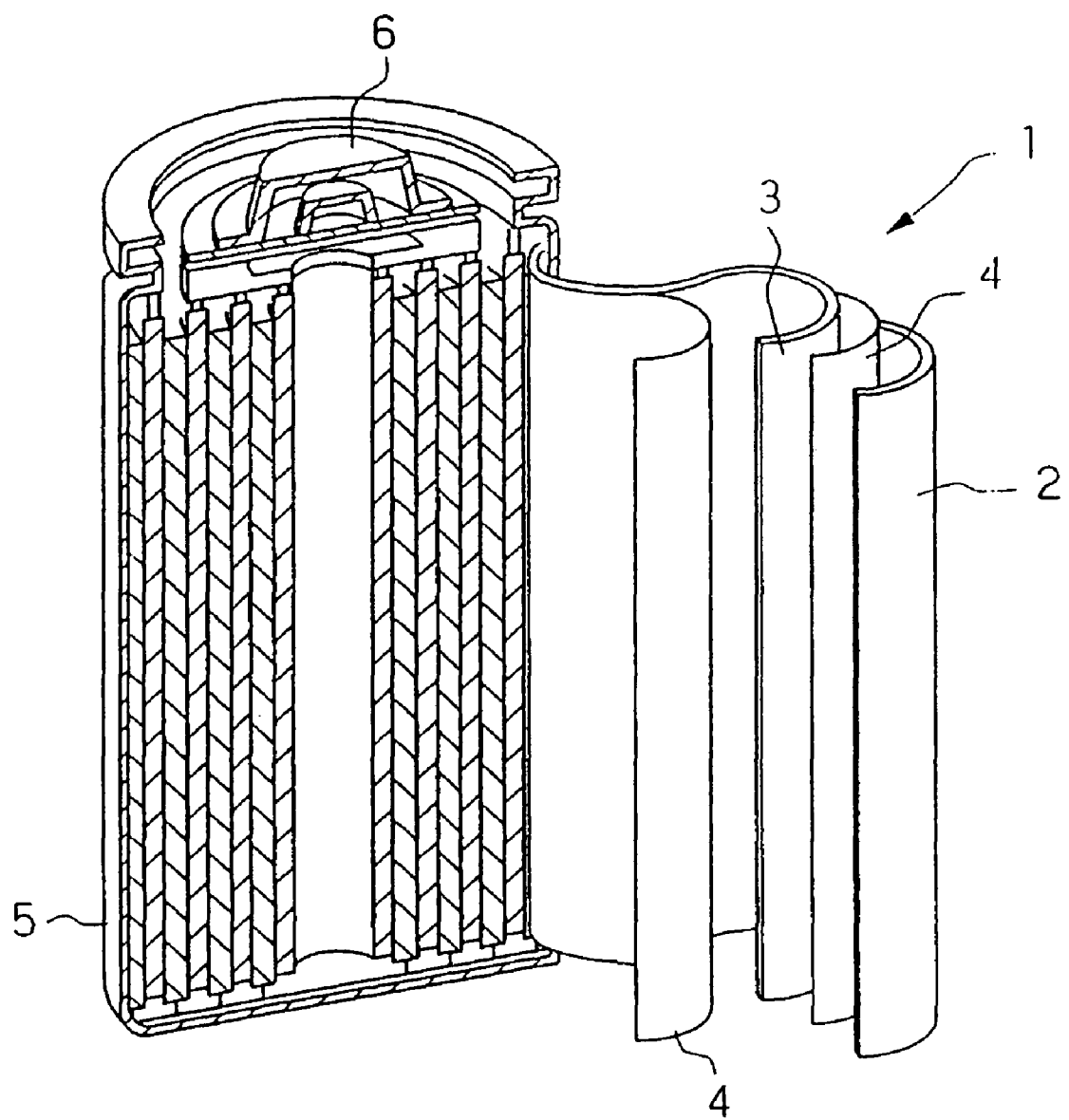
FIG. 3 is a perspective schematic view of a lithium battery according to one embodiment of the present invention.

As shown in FIG. 3, a lithium battery 1 according to one embodiment of the present invention includes a cathode 2, an anode 3, and an organic electrolytic solution described above. The anode 3 and cathode 2 are separated by a separator 4. To form the lithium battery 1, the anode 3, cathode 2 and separator 4 are wound together to form an electrode assembly and placed in a battery case 5 which is sealed with a cap assembly 6.

The type of lithium battery is not limited. The lithium battery can be a lithium primary battery or a lithium secondary battery such as a lithium ion battery, a lithium ion polymer battery and a lithium sulfur battery.

The C1 to C20 alkyl group (which is used as a substituent for the phosphate compound according to certain embodiments of the present invention) can be a linear or branched radical group. The linear or branched alkyl group may have from 1 to 12 carbon atoms. In one embodiment, the alkyl group has from 1 to 6 carbon atoms. In another embodiment, the alkyl group has from 1 to 3 carbon atoms. Nonlimiting examples of suitable C1 to C20 alkyl groups include methyl groups, ethyl groups, n-propyl groups, isopropyl groups, n-butyl groups, isobutyl groups, sec-butyl groups, t-butyl groups, pentyl groups, iso-amyl groups, hexyl groups, etc.

The C2 to C20 alkenyl group having a C—C double bond (which is used as a substituent for phosphate compounds according to certain embodiments of the present invention) is a linear or branched aliphatic hydrocarbonyl group. The alkenyl group may have from 2 to 12 carbon atoms. In one embodiment, the alkenyl group has from 2 to 6 carbon atoms. The branched aliphatic hydrocarbonyl group refers to a linear alkenyl group to which at least one low alkyl group or at least one low alkenyl group is attached. The alkenyl group may be unsubstituted, or may be substituted with at least one substituent, nonlimiting examples of which include halo, carboxy, hydroxy, formyl, sulfo, sulfano, carbamoyl, amino, and imino. Nonlimiting examples of suitable alkenyl groups include ethenyl groups, prophenyl groups, carboxyethenyl groups, carboxyprophenyl groups, sulfinoethenyl groups, sulfonoethenyl groups, etc.

The C6 to C30 aryl group (which is used as a substituent for phosphate compounds according to certain embodiments of the present invention) may be used alone or in combination, and refers to C6 to C30 carbocyclic aromatic systems including at least one ring. The rings may be attached together by fusing or by using a pendent method. The aryl group may include an aromatic radical, such as phenyl groups, naphthyl groups, tetrahydronaphthyl groups, indanyl groups, or biphenyl groups. In one embodiment, the aryl group is a phenyl group. The aryl group may have 1 to 3 substituents selected from hydroxy, halo, haloalkyl, nitro, cyano, alkoxy, and a low alkylamino.

The C2 to C30 heteroaryl group (which is used as a substituent for phosphate compounds according to certain embodiments of the present invention) refers to a monovalent, monocyclic or bicyclic aromatic radical containing from 5 to 30 ring atoms with 1, 2, or 3 heteroatoms selected from N, O, or S, where the other ring atoms are carbon atoms. In addition, the C2 to C30 heteroaryl group refers to a monovalent, monocyclic or bicyclic aromatic radical, wherein the heteroatoms are oxidized or quaternized to form, for example, an N-oxide or a quaternary salt. Nonlimiting examples of suitable C2 to C30 heteroaryl groups include thienyl groups, benzothienyl groups, pyridyl groups, pyrazinyl groups, pyrimidinyl groups, pyridazinyl groups, quinolinyl groups, quinoxalinyl groups, imidazolyl groups, furanyl groups, benzofuranyl groups, thiazolyl groups, isoxazolyl groups, benzisoxazolyl groups, benzimidazolyl groups, triazolyl groups, pyrazolyl groups, pyrrolyl groups, indolyl groups, 2-pyridonyl groups, 4-pyridonyl groups, N-alkyl-2-pyridonyl groups, pyrazinonyl groups, pyridazinonyl groups, pyrimidinonyl groups, oxazolonyl groups, N-oxides of these groups such as pyridyl N-oxide, quinolinyl N-oxide, and quaternary salts of these groups.

A method of manufacturing a lithium battery according to one embodiment of the present invention will now be described.

First, a cathode active material, a conductive agent, a binder, and a solvent are mixed to prepare a cathode active material composition. The cathode active material composition can be coated directly on an aluminum current collector and then dried to prepare a cathode plate. Alternatively, the cathode active material composition can be cast on a separate support to form a film which is then separated from the support and laminated on an aluminum current collector to prepare a cathode plate.

The cathode active material can be any lithium-containing metal oxide commonly used in the art. Nonlimiting examples of the cathode active material include $LiCoO_2$, $LiMn_xO_{2x}$, $LiNi_{x-1}Mn_xO_{2x}$ where x is 1 or 2, and $Ni_{1-x-y}Co_xMn_yO_2$ where $0 \leq x \leq 0.5$ and $0 \leq y \leq 0.5$.

Nonlimiting examples of suitable conductive agents include carbon black, etc. Nonlimiting examples of suitable binders include vinylidene fluoride/hexafluoropropylene copolymers, polyvinylidenefluoride, polyacrylonitrile, polymethylmethacrylate, polytetrafluoroethylene and mixtures thereof. Other nonlimiting examples of suitable binders include styrene butadiene rubber based polymers. Nonlimiting examples of suitable solvents include N-methylpyrrolidone, acetone, water, etc. The amounts of the cathode active material, the conductive agent, the binder, and the solvent are the same as those for conventional lithium batteries.

Similarly, an anode active material composition is prepared by mixing an anode active material, a conductive agent, a binder, and a solvent. The anode active material composition can be coated directly on a copper current collector to obtain an anode plate. Alternatively, the composition can be cast on a separate support to form a film, which is then separated from the support and laminated on a copper current collector to obtain an anode plate. The amounts of the anode active material, the conductive agent, the binder, and the solvent are the same as those for conventional lithium batteries.

Nonlimiting examples of suitable anode active materials include silicon metal, silicon thin films, lithium metal, lithium alloys, carbonaceous materials, or graphite. The anode active material composition and the cathode active material composition use the same conductive agent, the same binder, and the same solvent. When needed, the anode active material composition and the cathode active material composition may further include a plasticizer for forming pores in the electrode plates.

The separator can be any separator commonly used in lithium batteries. In particular, use of a separator having low resistance to ion mobility and good ability to retain the electrolytic solution is desired. Nonlimiting examples of suitable separators include glass fiber, polyester, Teflon, polyethylene, polypropylene, polytetrafluoroethylene (PTFE), and mixtures thereof, each of which can be a nonwoven fabric or a woven fabric. For example, a lithium ion battery may use a foldable separator formed of polyethylene or polypropylene, and a lithium ion polymer battery may use a separator having good ability to retain the organic electrolytic solution.

In an exemplary method of manufacturing a separator, a polymer resin, a filler, and a solvent are mixed to prepare a separator composition. Then, the separator composition can be coated directly on an electrode and dried to form a separator film. Alternatively, the separator composition can be cast on a separate support, dried and then separated from the support and laminated on an electrode to form a separator film.

The polymer resin is not limited and can be any material that is used as a binder for an electrode plate. Nonlimiting examples of suitable polymer resins include vinylidene fluoride/hexafluoropropylene copolymers, polyvinylidenefluoride, polyacrylonitrile, polymethylmethacrylate, and mixtures thereof. In one embodiment, the polymer resin is a vinylidene fluoride/hexafluoropropylene copolymer in which the amount of hexafluoropropylene ranges from about 8 to 25 wt %.

The separator is positioned between the cathode plate and the anode plate described above to form an electrode assembly. The electrode assembly is wound or folded and placed in a spherical or rectangular battery case. An organic electrolytic solution according to the present invention is then injected into the battery case to form a lithium ion battery.

Alternatively, a battery can be prepared in a bi-cell structure and then immersed in an organic electrolytic solution. The resulting assembly is placed in a pouch and sealed to form a lithium ion polymer battery.

The present invention will be described in further detail with reference to the following examples. The examples are presented for illustrative purposes only and are not intended to limit the scope of the present invention.

Example 1

Preparation of Electrolytic Solution

A mixed organic solvent containing 30 vol % of ethylene carbonate and 70 vol % of diethyl carbonate, 1 wt % of 4-methyl-2-(2,2,3,3-tetrafluoropropoxy)-1,3,2-dioxaphospholane (represented by formula 6 shown below) as an additive, 1.3M $LiPF_6$ as a lithium salt were mixed to prepare an organic electrolytic solution.

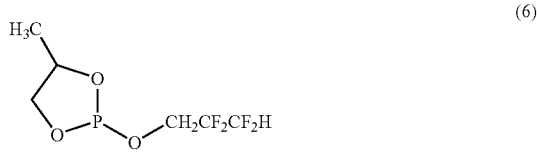

(6)

Example 2

Preparation of Electrolytic Solution

An organic electrolytic solution was prepared as in Example 1, except that 10 wt % of 4-methyl-2-(2,2,3,3-tetrafluoropropoxy)-1,3,2-dioxaphospholane was used.

Example 3

Preparation of Electrolytic Solution

An organic electrolytic solution was prepared as in Example 1, except that 15 wt % of 4-methyl-2-(2,2,3,3-tetrafluoropropoxy)-1,3,2-dioxaphospholane was used.

Example 4

Preparation of Electrolytic Solution

An organic electrolytic solution was prepared as in Example 1, except that 0.5 wt % of 4-methyl-2-(2,2,3,3-tetrafluoropropoxy)-1,3,2-dioxaphospholane was used.

Example 5

Preparation of Electrolytic Solution

An organic electrolytic solution was prepared as in Example 1, except that 20 wt % of 4-methyl-2-(2,2,3,3-tetrafluoropropoxy)-1,3,2-dioxaphospholane was used.

Comparative Example 1

Preparation of Electrolytic Solution

A mixed organic solvent of 30 vol % of ethylene carbonate and 70 vol % of diethyl carbonate and 1.3M $LiPF_6$ as a lithium salt were used to prepare an organic electrolytic solution. In this comparative Example, no additive was used.

Comparative Example 2

Preparation of Electrolytic Solution

An organic electrolytic solution was prepared as in Example 1, except that 0.05 wt % 4-methyl-2-(2,2,3,3-tetrafluoropropoxy)-1,3,2-dioxaphospholane was used as an additive.

Comparative Example 3

Preparation of Electrolytic Solution

An organic electrolytic solution was prepared as in Example 1, except that 30 wt % 4-methyl-2-(2,2,3,3-tetrafluoropropoxy)-1,3,2-dioxaphospholane was used as an additive.

Example 6

Manufacturing of Lithium Batteries 96 wt % of graphite based powder as an anode active material, 4 wt % of PVdF as a binder, and 100 ml of N-methyl pyrrolidone (NMP) were mixed and a ceramic ball was added to the mixture. Then, the mixture was stirred for about 10 hours. The resultant mixture was coated on a copper film having a thickness of 19 μm using a 300 μm-interval doctor blade, and then dried for about 10 hours in a 90° C. oven to remove the NMP. The dried film was roll pressed to produce an anode having a thickness of 120 μm.

A lithium electrode, which was used as a counter electrode, was prepared by pressing a 100 μm-thick lithium metal layer on a 20 μm-thick copper foil. As a result, an electrode having a thickness 120 μm was obtained.

A 2015-standard coin cell was prepared using the anode having a size of 2×3 $cm^2$, a PTFE separator, the lithium electrode as a counter electrode, and the organic electrolytic solution prepared according to Example 1.

Example 7

Manufacturing of Lithium Batteries

A 2015-standard coin cell was prepared as in Example 6, except that the organic electrolytic solution prepared according to Example 2 was used.

Example 8

Manufacturing of Lithium Batteries

A 2015-standard coin cell was prepared as in Example 6, except that the organic electrolytic solution prepared according to Example 3 was used.

Example 9

Manufacturing of Lithium Batteries

A 2015-standard coin cell was prepared as in Example 6, except that the organic electrolytic solution prepared according to Example 4 was used.

Example 10

Manufacturing of Lithium Batteries

A 2015-standard coin cell was prepared as in Example 6, except that the organic electrolytic solution prepared according to Example 5 was used.

Comparative Example 4

Manufacturing of Lithium Batteries

A 2015-standard coin cell was prepared as in Example 6, except that the organic electrolytic solution prepared according to Comparative Example 1 was used.

Comparative Example 5

Manufacturing of Lithium Batteries

A 2015-standard coin cell was prepared as in Example 6, except that the organic electrolytic solution prepared according to Comparative Example 2 was used.

Comparative Example 6

Manufacturing of Lithium Batteries

A 2015-standard coin cell was prepared as in Example 6, except that the organic electrolytic solution prepared according to Comparative Example 3 was used.

Experimental Example 1

Measurement of Flame Resistance of Electrolytic Solutions

Each of the electrolytic solutions prepared according to Examples 1 through 5 and Comparative Examples 1 through 3 were poured into beakers. Then, a thin glass fiber filter paper having a width of 15 mm, a length of 300 mm, and a thickness of 0.19 mm was immersed in each of the beakers for 10 minutes. Subsequently, the excess electrolytic solution soaked into the glass fiber filter paper was removed by contacting the paper with an edge of the beaker. Then, one end of each resulting glass fiber filter paper was clipped and vertically dangled. The lower end of each filter paper was heated using a gas lighter for three seconds. The time required to extinguish each soaked paper was measured, and the results are shown in Table 1.

TABLE 1

|  | Amount of Phosphate (wt %) | Time to extinguish (sec) |
|---|---|---|
| Example 1 | 1 | 8.0 |
| Example 2 | 10 | 7.9 |
| Example 3 | 15 | 7.8 |
| Example 4 | 0.5 | 8.4 |
| Example 5 | 20 | 7.3 |
| Comparative Example 1 | 0 | 8.4 |
| Comparative Example 2 | 0.05 | 8.4 |
| Comparative Example 3 | 30 | 6.5 |

As shown in Table 1, the electrolytic solutions prepared according to Examples 1 through 5 required a shorter time to extinguish than the electrolytic solutions prepared according to Comparative Examples 1 and 2. These results may be due to the addition of a flame-resistant additive. Although the inventive flame-resistant additives have poorer flame resistance than the conventional additive having good flame resistance, the inventive flame-resistant additives have excellent cycle efficiency and charge/discharge capacity in addition to flame resistance.

Experimental Example 2

Charge/Discharge Property Test of Battery

Each of the coin cells manufactured according to Examples 6 through 10 and Comparative Examples 4 through 6 was charged with a constant current of 60 mA per 1 g of the active material until a voltage of 0.001 V with respect to the Li electrode was reached. The coin cells were then continuously charged with a constant voltage of 0.001 V until the current decreased to 5 mA per 1 g of the active material. Subsequently, the coin cells were discharged with a constant current of 60 mA per 1 g of the active material until a voltage of 1.5 V was reached. As a result, the charge/discharge capacity was obtained and the charge/discharge efficiency was measured. The charge/discharge efficiency can be expressed as follows in Equation 1.

Charge/Discharge Efficiency (%)=Discharge Capacity/Charge Capacity    Equation 1

The charge/discharge capacity and charge/discharge efficiency were measured at each cycle. The test results for the coin cells manufactured according to Examples 6 through 10 and Comparative Examples 4 through 6 are shown in Table 2, and FIGS. 1 and 2.

TABLE 2

| | First Cycle | | | Tenth Cycle | | |
|---|---|---|---|---|---|---|
| | Charge Capacity (mAh/g) | Discharge Capacity (mAh/g) | Charge/Discharge Efficiency (%) | Charge Capacity (mAh/g) | Discharge Capacity (mAh/g) | Charge/Discharge Efficiency (%) |
| Example 6 | 240 | 217 | 90 | 184 | 183 | 99 |
| Example 7 | 245 | 226 | 92 | 178 | 180 | 101 |
| Example 8 | 233 | 216 | 93 | 175 | 174 | 99 |
| Example 9 | 221 | 199 | 90 | 167 | 164 | 98 |
| Example 10 | 189 | 176 | 95 | 150 | 149 | 99 |
| Comparative Example 4 | 220 | 191 | 87 | 160 | 158 | 99 |
| Comparative Example 5 | 215 | 187 | 87 | 157 | 155 | 99 |
| Comparative Example 6 | 175 | 165 | 94 | 143 | 141 | 99 |

Figure 2:
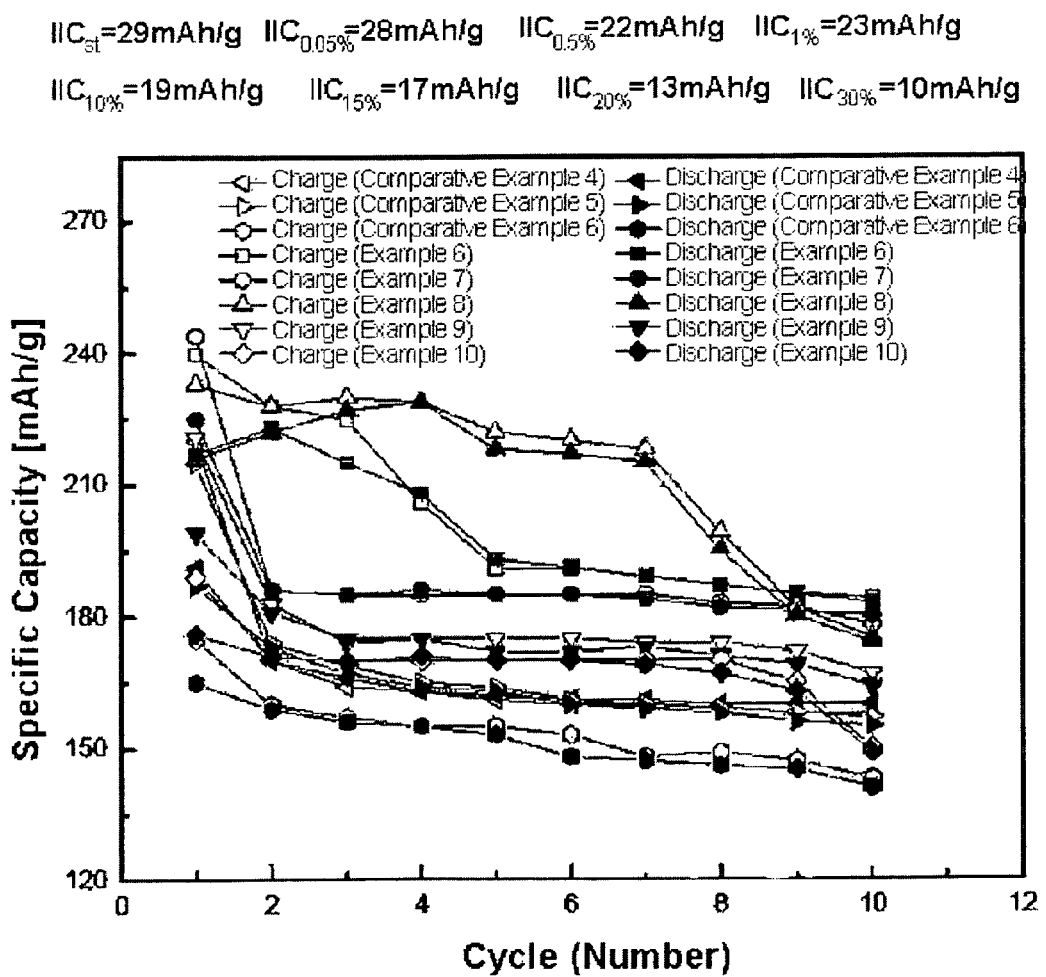
FIG. 2 is a graph of the specific capacities of lithium batteries prepared according to Examples 6 through 10 and Comparative Examples 4 through 6, in which IIC represents irreversible specific capacity.

Referring to FIGS. 1 and 2, in the first cycle: the coin cells manufactured according to Examples 6 through 10 had charge/discharge efficiencies of 90% or more, but the coin cells manufactured according to Comparative Examples 4 and 5 had charge/discharge efficiencies of 87%. Although the coin cell manufactured according to Comparative Example 6 exhibited high charge/discharge efficiency in the first cycle, the charge/discharge capacity was low. In addition, the coin cells manufactured according to Examples 6 through 10 exhibited constant charge/discharge efficiencies in the fourth and later cycles, and thus had excellent charge/discharge properties compared to the conventional coin cells which exhibited poor charge/discharge properties when flame-resistant materials were added. In addition, the coin cells manufactured according to Examples 6 through 10 had irreversible capacities ranging from 13 to 23 mAh/g, but the coin cells manufactured according to Comparative Examples 4 and 5 had irreversible capacities ranging from 28 to 29 mAh/g. Although the coin cell manufactured according to Comparative Example 6 exhibited a low irreversible capacity of 10 mAh/g, the charge/discharge capacity was low, as described above. Such an improvement in the charge/discharge properties may result from improved electrochemical stability at the surface of the anode due to bulky functional groups and fluorine in the compound, which improves the properties of the SEI film.

The inventive organic electrolytic solutions and lithium batteries including such solutions are flame resistant and have excellent charge/discharge properties due to the use of phosphate based compounds. Accordingly, the inventive lithium batteries are highly stable and reliable, and have good charge/discharge efficiency.

While the present invention has been described with reference to certain exemplary embodiments, it will be understood by those of ordinary skill in the art that various alterations and changes may be made without departing from the spirit and scope of the present invention as defined by the following claims.

What is claimed is:
1. An organic electrolytic solution comprising:
a lithium salt;
an organic solvent comprising a first solvent having high permittivity and a second solvent having a low boiling point; and
a phosphate compound represented by Formula 2 or 3, wherein the phosphate compound is present in an amount ranging from about 0.5 to about 20 wt % based on the total weight of the organic solvent:

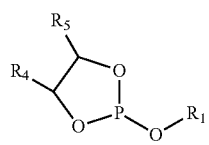

(2)

(3)

P(OCH$_2$R$_4$)(OCH$_2$R$_5$)(OCH$_2$R$_6$)

where R$_1$ is selected from the group consisting of unsubstituted alkyl groups having from 1 to 20 carbon atoms, halogen substituted alkyl groups having from 1 to 20 carbon atoms, unsubstituted alkenyl groups having from 2 to 20 carbon atoms, halogen substituted alkenyl groups having from 2 to 20 carbon atoms, unsubstituted aryl groups having from 6 to 30 carbon atoms, halogen substituted aryl groups having from 6 to 30 carbon atoms, halogen substituted aryl groups having from 6 to 30 carbon atoms, unsubstituted heteroaryl groups having from 2 to 30 carbon atoms, and halogen substituted heteroaryl groups having from 2 to 30 carbon atoms, and
where each of R$_4$, R$_5$ and R$_6$ is independently selected from the group consisting of hydrogen atoms, unsubstituted alkyl groups having from 1 to 20 carbon atoms, and alkyl groups having from 1 to 20 carbon atoms in which at least one hydrogen atom is substituted with a halogen atom.

2. The organic electrolytic solution of claim 1, wherein the phosphate compound is present in an amount ranging from about 1 to about 15 wt % based on the total weight of the organic solvent.

3. The organic electrolytic solution of claim 1, wherein the lithium salt is present in a concentration ranging from about 0.5 to about 2.0 M.

4. The organic electrolytic solution of claim 1, wherein the first solvent having high permittivity is selected from the group consisting of ethylene carbonate, polypropylene carbonate, butylene carbonate, gamma-butyrolactone and mixtures thereof.

5. The organic electrolytic solution of claim 1, wherein the second solvent having a low boiling point is selected from the group consisting of dimethyl carbonate, ethylmethyl carbonate, diethyl carbonate, dipropyl carbonate, dimethoxyethane, diethoxyethane, aliphatic ester derivatives, and mixtures thereof.

6. The organic electrolytic solution of claim 1, wherein the lithium salt is LiPF$_6$, the first solvent having high permittivity is ethylene carbonate, the second solvent having a low boiling point is diethyl carbonate, and the phosphate compound is 4-methyl-2-(2,2,3,3-tetrafluoropropoxy)-1,3,2-dioxaphosphorane.

7. A lithium battery comprising:
a cathode;
an anode; and
the organic electrolytic solution of claim 1.

8. An organic electrolytic solution comprising:
a lithium salt;
an organic solvent comprising:
a first solvent selected from the group consisting of ethylene carbonate, polypropylene carbonate, butylene carbonate, gamma-butyrolacetone and mixtures thereof,
a second solvent selected from the group consisting of dimethyl carbonate, ethylmethyl carbonate, diethyl carbonate, dipropyl carbonate, dimethoxyethane, diethoxyethane, aliphatic ester derivatives, and mixtures thereof; and
a phosphate compound selected from the group consisting of compounds represented by Formulae 2, 3, 5, 6 and 7, wherein the phosphate compound is present in an amount ranging from about 0.5 to about 20 wt % based on the total weight of the organic solvent:

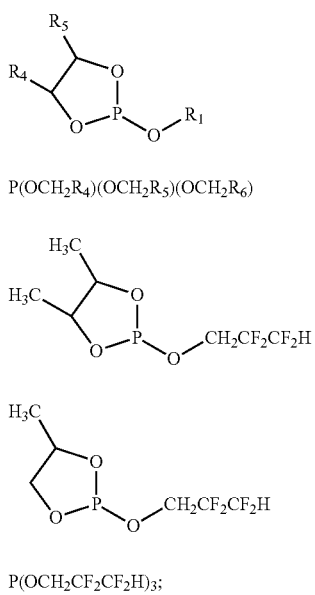

P(OCH₂R₄)(OCH₂R₅)(OCH₂R₆)   (3)

(5)

(6)

P(OCH₂CF₂CF₂H)₃;   (7)

where $R_1$ is selected from the group consisting of unsubstituted alkyl groups having from 1 to 20 carbon atoms, halogen substituted alkyl groups having from 1 to 20 carbon atoms, unsubstituted alkenyl groups having from 2 to 20 carbon atoms, halogen substituted alkenyl groups having from 2 to 20 carbon atoms, unsubstituted aryl groups having from 6 to 30 carbon atoms, halogen substituted aryl groups having from 6 to 30 carbon atoms, halogen substituted aryl groups having from 6 to 30 carbon atoms, unsubstituted heteroaryl groups having from 2 to 30 carbon atoms, and halogen substituted heteroaryl groups having from 2 to 30 carbon atoms, and where each of $R_4$, $R_5$ and $R_6$ is independently selected from the group consisting of hydrogen atoms, unsubstituted alkyl groups having from 1 to 20 carbon atoms, and alkyl groups having from 1 to 20 carbon atoms in which at least one hydrogen atom is substituted with a halogen atom.

9. The organic electrolytic solution of claim 8, wherein the phosphate compound is present in an amount ranging from about 1 to about 15 wt % based on the total weight of the organic solvent.

10. A lithium battery comprising:
a cathode;
an anode; and
the organic electrolytic solution of claim 8.

11. An organic electrolytic solution comprising:
a lithium salt;
an organic solvent comprising a first solvent having high permittivity and a second solvent having a low boiling point; and
a phosphate compound selected from the group consisting of compounds represented by Formulae 2 and 3:

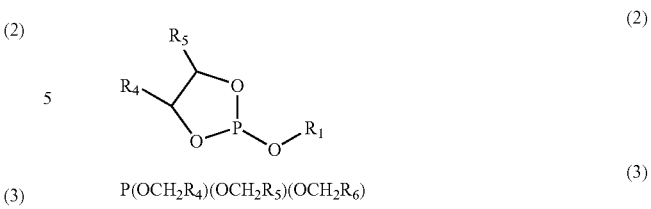

P(OCH₂R₄)(OCH₂R₅)(OCH₂R₆)   (3)

wherein $R_1$ is selected from the group consisting of unsubstituted alkyl groups having from 1 to 20 carbon atoms, halogen substituted alkyl groups having from 1 to 20 carbon atoms, unsubstituted alkenyl groups having from 2 to 20 carbon atoms, halogen substituted alkenyl groups having from 2 to 20 carbon atoms, unsubstituted aryl groups having from 6 to 30 carbon atoms, halogen substituted aryl groups having from 6 to 30 carbon atoms, unsubstituted heteroaryl groups having from 2 to 30 carbon atoms, and halogen substituted heteroaryl groups having from 2 to 30 carbon atoms, and wherein each of $R_4$, $R_5$ and $R_6$ is independently selected from the group consisting of hydrogen atoms, unsubstituted alkyl groups having from 1 to 20 carbon atoms, and alkyl groups having from 1 to 20 carbon atoms in which at least one hydrogen atom is substituted with a halogen atom, wherein at least one of $R_4$ and $R_5$ is not a hydrogen atom.

12. The organic electrolytic solution of claim 11, wherein the phosphate compound is selected from the group consisting of compounds represented by Formulae 5, 6 and 7:

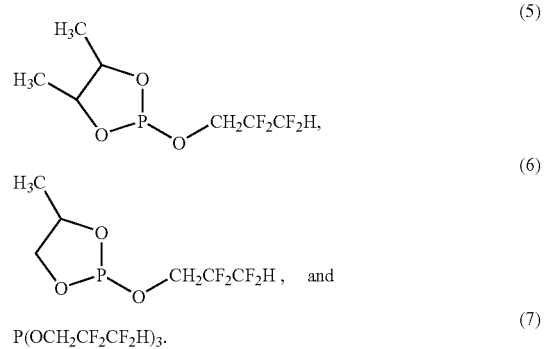

P(OCH₂CF₂CF₂H)₃.   (7)

13. An organic electrolytic solution comprising: a lithium salt; an organic solvent comprising a first solvent having high permittivity and a second solvent having a low boiling point; and a phosphate compound represented by Formula 5, 6, or 7, wherein the phosphate compound is present in an amount ranging from about 0.5 to about 20 wt % based on the total weight of the organic solvent:

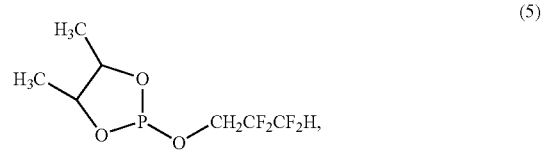

-continued
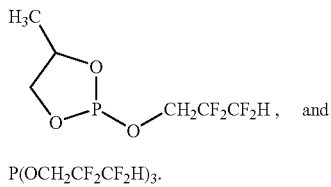 (6)
and
P(OCH₂CF₂CF₂H)₃. (7)
14. The organic electrolytic solution of claim 13, wherein the phosphate compound is preset in an amount ranging from about 1 to about 15 wt % based on the total weight of the organic solvent.
15. A lithium battery comprising:
 a cathode;
 an anode; and
 the organic electrolytic solution of claim 13.
* * * * *

UNITED STATES PATENT AND TRADEMARK OFFICE
CERTIFICATE OF CORRECTION

| | | |
|---|---|---|
| PATENT NO. | : 8,062,796 B2 | Page 1 of 1 |
| APPLICATION NO. | : 11/508627 | |
| DATED | : November 22, 2011 | |
| INVENTOR(S) | : Jae-gu Yoon et al. | |

It is certified that error appears in the above-identified patent and that said Letters Patent is hereby corrected as shown below:

In the Claims

Column 14, Claim 1, lines 6-7       Delete "halogen substituted aryl groups having from 6 to 30 carbon atoms,"

Column 14, Claim 8, line 49         Delete "gamma-butyrolacetone"
                                     Insert -- gamma-butyrolactone --

Column 15, Claim 8, lines 35-36     Delete "halogen substituted aryl groups having from 6 to 30 carbon atoms,"

Column 18, Claim 14, line 2         Delete "preset"
                                     Insert -- present --

Signed and Sealed this
Twenty-seventh Day of November, 2012

David J. Kappos
*Director of the United States Patent and Trademark Office*